United States Patent
Wilfinger et al.

(10) Patent No.: US 6,228,931 B1
(45) Date of Patent: May 8, 2001

(54) WATER-DILUTABLE FILM-FORMING BINDERS

(75) Inventors: Werner Wilfinger; Ingo Kreissmann; Kurt Gossak; Johann Luttenberger, all of Graz (AT)

(73) Assignee: Vianova Resins AG, Werndorf (AT)

( * ) Notice: Subject to any disclaimer, the term of this patent is extended or adjusted under 35 U.S.C. 154(b) by 0 days.

(21) Appl. No.: 09/264,883

(22) Filed: Mar. 9, 1999

(30) Foreign Application Priority Data

Mar. 11, 1998 (AT) ................................................ A429/98

(51) Int. Cl.[7] .............................. C08J 3/05; C08L 33/00; C08L 75/04; C08L 62/00; C08L 61/12

(52) U.S. Cl. ........................ 524/501; 524/507; 524/508; 524/509; 524/510; 524/513; 524/522; 524/523

(58) Field of Search ..................................... 524/548, 560, 524/531, 556, 501, 507, 508, 509, 510, 513, 522, 523

(56) References Cited

U.S. PATENT DOCUMENTS

| | | | |
|---|---|---|---|
| 4,871,807 | 10/1989 | Staritzbichler et al. | 525/113 |
| 5,811,484 | 9/1998 | Wilfinger et al. | 524/548 |

FOREIGN PATENT DOCUMENTS

| | | |
|---|---|---|
| 2058371 | 6/1992 | (CA) . |
| 2162682 | 11/1994 | (CA) . |
| 0 754 718 A2 | 1/1997 | (EP) . |
| 1 475 348 | 6/1977 | (GB) . |

*Primary Examiner*—Peter A. Szekely
(74) *Attorney, Agent, or Firm*—Foley & Lardner

(57) ABSTRACT

A low-solvent aqueous binder includes: a water-insoluble synthetic resin component A; and an emulsifier resin B in a mass ratio of A to B of from 70:30 to 30:70. The emulsifier resin B is a reaction product of a water-insoluble synthetic resin B1 that includes hydroxyl groups as functional groups, a synthetic resin B2 that includes carboxyl groups as functional groups, and a neutralizing agent for the carboxyl groups of B. The amount of the neutralizing agent is such that the neutralizing agent is able to neutralize from 5 to 200% of the carboxyl groups of B. A process for preparing a low-solvent aqueous binder includes: mixing the water-insoluble synthetic resin component B1 comprising hydroxyl functional groups and the synthetic resin B2 in bulk or dissolved in an organic solvent to form a mixture; removing the solvent by applying subatmospheric pressure and heating until the content of the mixture is at least 85% by mass; maintaining the mixture at a temperature from 90° to 150° C. until the reaction product of the mixture is homogeneously emulsifiable in a mass ratio of 3 parts of resin to 7 parts of water; neutralizing the reaction product by adding a neutralizing agent in an amount sufficient to neutralize from 5 to 200% of carboxyl groups that have remained following the reaction; adding the water-insoluble synthetic resin A in a mass ratio of A to B of from 70:30 to 30:70, and emulsifying the mixture in water.

14 Claims, No Drawings

WATER-DILUTABLE FILM-FORMING BINDERS

BACKGROUND OF THE INVENTION

1. Field of the Invention

The present invention relates to externally emulsified low-solvent aqueous binders, processes for their preparation and use, as well as to coating compositions, adhesives, and the like comprising such binders.

2. Description of Related Art

Water-dilutable binders obtained by mixing or partial condensation of a polycarboxyl component which is soluble in water following neutralization of the carboxyl groups with a resinous polyhydroxyl component which per se is not dilutable in water and featuring favorable viscosity characteristics on dilution with water are described in a series of patents; for example in Austrian Patent B 328 587, Austrian Patent B 379 607, Austrian Patent B 388 738 and Austrian Patent B 388 382.

Austrian Patent B 328 587 specifies acrylate copolymers as a usable polycarboxyl component; however, on the basis of the customary monomer composition described therein, it is impossible to formulate any coating materials which would be useful in practice, since these coating materials have disadvantages in their application properties, such as the tendency toward blistering and toward running during stoving operations, even at low film thicknesses. German Patent DE-C 43 15 593 describes externally emulsified two-component coating compositions comprising a water-insoluble, hydroxyl-containing polyester or polyacrylate resin which is emulsified by adding anionic, cationic or nonionic emulsifiers in a proportion of from 0.1 to 1% relative to the mass of the resin dissolved in an organic solvent, and comprising a liquid organic polyisocyanate.

In general, externally emulsified aqueous binder systems, including the system described in DE-C 43 15 593, exhibit considerable disadvantages which considerably restrict the scope for their application. For example, they possess inadequate shear stability; the preparation of stable pigment pastes is difficult if not impossible; the resistance of the coating films produced with them is inadequate, especially to water; and, finally, their stability on storage is inadequate. "Externally emulsified" means that a substance which itself is not water-emulsifiable has been carried into an aqueous emulsion by virtue of addition of an emulsifying agent. In contrast to that, "internally emulsified" means that a substance which in itself is not water-soluble or water-dispersible has been modified by chemical incorporation of moieties that have hydrophilic character, thereby rendering the (modified) substance water-dispersible or water-emulsifiable.

SUMMARY OF THE INVENTION

In accordance with the present invention, there is provided an externally emulsified low-solvent aqueous binder comprising: a water-insoluble synthetic resin component A; and an emulsifier resin B. The resin B has functional groups comprising carboxyl groups and hydroxyl groups. The resin B is a reaction product of a water-insoluble synthetic resin B1 comprising hydroxyl groups as functional groups, a synthetic resin B2 comprising carboxyl groups as functional groups, and a neutralizing agent for the carboxyl groups of B. The amount of the neutralizing agent is such that said neutralizing agent is able to neutralize from 5 to 200% of the carboxyl groups of B. In further accordance with the present invention, there is provided a process for preparing an externally emulsified low-solvent aqueous binder comprising: (i) mixing components a water-insoluble synthetic resin containing hydroxyl functional groups B1 and a synthetic resin containing carboxyl functional groups B2 in bulk or dissolved in organic solvents, (ii) removing the solvent by applying subatmospheric pressure and heating until the solids content is at least 85% by mass, (iii) maintaining the mixture at a temperature from 90° to 150° C. until the reaction product is homogeneously emulsifiable in a mass ratio of 3 parts of resin to 7 parts of water, (iv) neutralizing the reaction product by adding a neutralizing agent in an amount sufficient to neutralize from 5 to 200% of the carboxyl groups that have remained following the reaction, (v) adding a water-insoluble synthetic resin A, and (vi) emulsifying the mixture in water. In the context of this invention, the term "low solvent" means a composition that has a mass fraction of 25% or less of solvents, preferably less than 20 %. Preferably, the components B1 and B2 are used in such amounts that the mass fraction of the hydroxyl-containing synthetic resin B1 is from 85 to 55% of the sum of the masses of the resins B1 and B2 and the mass fraction of the carboxyl-containing synthetic resin B2 is from 15 to 45%, the sum of the mass fractions adding to 100%.

Additional objects, features and advantages of the invention will be set forth in the description which follows, and in part will be obvious from the description, or may be learned by practice of the invention. The objects, features and advantages of the invention may be realized and obtained by means of the instrumentalities and combinations particularly pointed out in the appended claims.

DETAILED DESCRIPTION OF THE PREFERRED EMBODIMENT

The invention relates accordingly to externally emulsified, low-solvent aqueous binders which possess the aforementioned disadvantages to a reduced extent if at all, comprising a water-insoluble synthetic resin component A and an emulsifier resin B, whose functional groups include carboxyl groups and hydroxyl groups and which is an esterification-prepared product of reaction of a water-insoluble synthetic resin B1 comprising hydroxyl groups as functional groups and of a synthetic resin B2 comprising carboxyl groups as functional groups, and a neutralizing agent for the carboxyl groups of B, the amount of the neutralizing agent being such that it is able to neutralize from 5 to 200%, preferably from 25 to 150%, of the carboxyl groups of B. Preferably, the synthetic resin B2 is chosen such that following at least partial neutralization, it can be emulsified homogeneously in water.

The present binders are preferably externally emulsified, low-solvent film-forming binders comprising a water-insoluble resin component and as emulsifier resin, a carboxyl- and hydroxy-functional reaction product of a hydroxy-functional polymer (polyhydroxy component) which is preferably essentially insoluble in water and a carboxyl-functional polymer (polycarboxyl component) which is preferably soluble in water following at least partial neutralization. The water-insoluble resin component to be emulsified is preferably added to the emulsifier resin prior to its emulsification in water and then, following at least partial neutralization of the carboxyl groups with amines or alkalis, the mixture obtained is advantageously transformed into an aqueous emulsion by adding water to it or by stirring it into water.

In particular, the emulsifier resin B suitably has an acid number of from 25 to 100 mg/g, preferably from 30 to 80 mg/g.

The emulsifier resin B can be prepared in any way desired and is preferably prepared such that in a first step, a carboxyl-functional polymer B2 (polycarboxyl component), which preferably has an acid number of from 40 to 350 mg/g, in particular from 100 to 250 mg/g, is mixed with an essentially water-insoluble, hydroxy-functional polymer B1 (polyhydroxy component) preferably having a hydroxyl number of from 40 to 250 mg/g and, if desired, an epoxy group content, based on the mass of the solid, of from 35 to 260 mmol/kg.

It may be possible to employ the polymers B1 and B2 without solvent or dissolved in an organic solvent, with the preferred proviso that the mixture has an acid number of at least 25 mg/g. Subsequently, in a second step, the solvent is removed by applying a subatmospheric pressure and heating until the mass fraction of solids is at least 85% by mass. In a third step the mixture is reacted at a temperature of from 90° to 150° C. until a sample neutralized with a base can be emulsified homogeneously with water in a mass ratio of resin B to water of 3:7.

The externally emulsified low-solvent aqueous binders can then be prepared for example, by neutralizing, in a fourth step, the emulsifier resin whose preparation is described above by adding a neutralizing agent in an amount sufficient to neutralize from 5 to 200%, preferably from 5 to 150%, more preferably from 25 to 150% of the carboxyl groups in B2 that have remained following the reaction. Then, in a fifth step, the synthetic resin B1, is added and finally, in a sixth step, the mixture is emulsified in water. The aqueous binders can also be prepared by first adding B1 to B2, neutralizing the mixture and holding it at from 90° to 150° C. until a neutralized sample in water has been tested by the abovementioned method and found to be homogeneously emulsifiable.

The known testing standard DIN 53 402 defines the acid number (abbreviated as "acid no.") as the quotient of that mass $m_{KOH}$ of potassium hydroxide required to neutralize a sample B for analysis and the mass $m_B$ of this sample (mass of the solid in the sample in the case of solutions or dispersions); its customary unit is "mg/g". Another known testing standard DIN 53 240 defines the hydroxyl number (abbreviated as "hydroxyl no.") as the quotient of that mass $m_{KOH}$ of potassium hydroxide which has exactly the same number of hydroxyl groups as a sample B for analysis and the mass $m_B$ of this sample (mass of the solid in the sample in the case of solutions or dispersions); its customary unit is "mg/g". The specific (mass-based) epoxy group content SEC is defined as the quotient of the amount of substance $n_{EP}$ of epoxy groups and the mass of the sample $m_B$ (mass of the solid of the sample if it is a solution or dispersion); the customary unit is mmol/kg. The reciprocal of the SEC is also referred to as "epoxy equivalent weight" or "epoxy equivalent" or "EV", with the unit g/mol. By "homogeneously emulsifiable" here is meant that the naked eye is unable to perceive any discrete particles or resin droplets and that the resultant emulsion shows no inhomogeneity or settling even after storage at room temperature for 24 hours.

Component B2 is preferably selected such that it is homogeneously emulsifiable following at least partial neutralization. To achieve this, preferably at least 5% of the carboxyl groups in B2 should be neutralized by adding an adequate amount (viz., the amount needed to neutralise said 5%) of a neutralizing agent (for example alkali hydroxides, amines and/or other suitable neutralizing agents).

In this context, component B1 and B2 can each suitably be selected from polymers such as polyacrylates, polyesters, polyurethanes, epoxy resins, alkyd resins, melamine resins and phenolic resins. The term polyesters includes those which comprise minor proportions of polyether and polyamide segments; the polyurethanes may also include polyether, polyester and polyurea segments. In this case, the mole fraction of the segments, each attached in different ways, within the polymers preferably should not exceed 20%.

As component B1, it is preferred to employ hydroxyl-containing polyacrylates and as component B2, carboxyl-containing polyacrylates. By polyacrylates are meant below those synthetic resins synthesized using a monomer mixture having a mole fraction of at least 50% of monomers derived from acrylic or methacrylic acid (or comprising these acids themselves). These so-called acrylic monomers can suitably be selected, accordingly, from the alkyl and hydroxyalkyl esters of acrylic and methacrylic acid, from these acids themselves, their amides, their N-alkyl and N,N-dialkyl amides, their nitriles, and their esters with epoxidized alcohols, an example being glycidyl (meth)acrylate. The alkyl or hydroxyalkyl groups independently of one another preferably have from 1 (or 2) to 18, more preferably up to 8 and, with particular preference, up to 4 carbon atoms. Suitable comonomers are all free-radically copolymerizable olefinically unsaturated monomers.

Particular preference is given to the use of methyl acrylate, ethyl acrylate, hydroxy ethyl and hydroxypropyl acrylate, and also butyl acrylate and 2-ethylhexyl acrylate, and the corresponding methacrylates. It is also possible to employ monoesters of (meth)acrylic acid with polyalkylene ether glycols such as polyethylene glycol and polypropylene glycol. As the comonomer, use can suitably be made, for example, of aromatic vinyl compounds, such as styrene and vinyl toluene, vinyl ethers such as methyl vinyl ether, vinyl esters such as vinyl acetate and vinyl propionate, and also Versatic acid vinyl esters, and also $\alpha$,-unsaturated (di) carboxylic acids and their esters and monoesters, such as dimethyl maleate, methyl crotonate, monomethyl mesaconate, etc. The desired carboxyl and/or hydroxyl functionality is established by choosing the nature and amount of the carboxyl- and/or hydroxy-functional monomers.

The components B1 and B2 can be prepared in a conventional manner, preferably by solution polymerization, with particular preference in alcohols or glycol ethers. The addition polymerization can be triggered by adding free-radical initiators, such as peroxides, peroxy ethers or aliphatic azo compounds, at elevated temperature (preferably from 60° to 160° C.).

The emulsified, water-insoluble binders A can likewise suitably be selected from the groups of the polyacrylates, polyesters, polyurethanes, epoxy resins, alkyd resins, melamine resins and phenolic resins. It is particularly preferred to choose synthetic resins A to be emulsified from the same group as the components of the emulsifier B.

As the water-insoluble resin component A to be emulsified, use can preferably be made primarily of hydroxy-functional acrylic resins and also of acrylic resins which carry carboxyl groups or carboxyl and hydroxyl groups, which can be added to the emulsifier resin B, freed substantially from the solvent, prior to its emulsification in water, suitably in a ratio by mass of from 70:30 to 30:70, preferably from 60:40 to 40:60. Following at least partial neutralization with a neutralizing agent, preferably of amines and/or alkalis, the resin mixture is preferably transformed into an aqueous emulsion. Partial neutralization here means that a fraction of at least 5%, preferably at least 25%, of the carboxyl acid groups originally present in the polymer are converted into carboxylate groups. There is no critical upper limit on the amount of neutralizing agent, it is preferably chosen such that up to 200%, with particular preference up to 150%, of the acid groups originally present could be neutralized.

It is also possible to make advantageous use of an emulsifier B for coatings additives which per se are insoluble in water. In this case, the mass ratios preferably can range from 85:15 to 15:85 of the emulsifier B to the additive A.

For the emulsification, it is possible to employ a procedure of direct emulsification as well as of inverse emulsification (stirring the resin mixture into an excess of water, or stirring water into the resin mixture under high shear, preferably with an ultrasonic mixer, a mixer with a dissolver disc, or a mixer of the rotor-stator type).

The binders of the present invention can be employed in any desired use, for example in one-component systems, such as melamine resin-crosslinking stoving enamels, or as two-component systems, such as isocyanate-crosslinking coating materials, coating materials which crosslink at room temperature, coating materials which crosslink at elevated temperature under forced drying conditions, or coating materials which crosslink under stoving conditions.

Relative to the prior art, the binder products of the present invention are considerably improved in terms of topcoat holdout, levelling and gloss, with preferably no deterioration in resistance to chemicals and the effects of weathering.

Aqueous binders formulated with the present emulsifiers can be employed advantageously in coating compositions of metals, wood, paper and board, leather, and other substrates, both rigid and flexible. It is also possible to formulate aqueous adhesives and adhesion primers in this way. With the aid of the emulsifier resins, it may be additionally possible to provide otherwise water-insoluble sizing agents, for textiles and impregnating compositions, for example, for paper, for example, in water-soluble or water-dilutable formulations.

The invention is illustrated by the following examples.

In the following examples, as in the text which precedes them, all figures with the unit "%" are mass fractions (ratio of the mass of the component in question to the sum of masses of all components present in the mixture) unless stated otherwise. "Parts" are always parts by mass. Concentration figures in "%" are mass fractions of the dissolved solid in the solution (ratio of mass of solute, or dissolved substance, to mass of solution).

Preparing the Emulsifier Resins

Preparation of the acrylate-based polycarboxyl components B2 and polyhydroxy components B1 used in the examples The copolymers were prepared in a conventional manner by solution polymerization in isopropanol in accordance with a calculated solids content of 50% by mass for the polycarboxyl components B2 and 65% by mass for the polyhydroxy components B1. In this preparation, the isopropanol used as solvent was introduced initially and heated to reflux and the monomer mixture together with a mass fraction of 2% of azobis isovaleronitrile as an initiator was metered in over the course of 5 hours, with the mixture being kept at the boiling point. After a postpolymerization period (1 hour) the mixture was cooled and stored for further use. The nature and amount of the monomers employed, and the parameters determined, are summarized in Table 1.

TABLE 1

| Monomers employed | Polycarboxyl component | | | | Polyhydroxy component | | | |
|---|---|---|---|---|---|---|---|---|
| | B2-4 | B2-1 | B2-2 | B2-3 | B1-1 | B1-2 | B1-3 | B1-4 |
| Butylacrylate | — | 34 | 35 | 12 | 30 | — | 20 | — |
| Ethylacrylate | 25 | — | — | — | — | 30 | — | — |
| 2-Ethylhexyl acrylate | — | — | — | 28 | — | — | — | — |
| Methyl methacrylate | 13 | 27 | — | 30 | — | — | 30 | — |
| Isobutyl methacrylate | — | — | — | — | — | — | — | — |
| Isobornyl methacrylate | — | 26 | — | — | 20 | — | — | 22 |
| Styrene | 22 | — | 40 | — | 39 | 45 | — | 20 |
| Acrylic acid | 40 | 13 | — | 30 | — | — | — | — |
| Methacrylic acid | — | — | 25 | — | — | — | — | — |
| 2-Hydroxyethyl acrylate | — | — | — | — | — | 25 | — | — |
| 4-Hydroxybutyl acrylate | — | — | — | — | — | — | — | 35 |
| 2-Hydroxyethyl acrylate methacrylate | — | — | — | — | 10 | — | 40 | 23 |
| Tripropylene glycol methacrylate | — | — | — | — | — | — | 10 | — |
| Glycidyl methacrylate | — | — | — | — | 1 | — | — | — |
| Acid no. in mg/g | 311 | 101 | 163 | 233 | — | — | — | — |
| Hydroxyl no. in mg/g | — | — | — | — | 43 | 121 | 167 | 235 |
| Specific epoxy group content in mmol/kg | — | — | — | — | 70 | — | — | — |

Preparing Externally Emulsified Acrylic Resins

EXAMPLE 1

A mixture of 120 parts of B2-4 (240 g of solution) with 180 parts of B1—1 (276.9 g of solution) in a suitable reactor was concentrated by distillation to a mass fraction of solids of 91%. It was then held at 105° C. until the reaction product in a mixing ratio of 3 g of resin to 7 g of water was homogeneously emulsifiable in accordance with the above-mentioned specification. The emulsifier resin (acid no.=124 mg/g, hydroxyl no.=26 mg/g) was admixed with N,N-dimethyl ethanolamine until a degree of neutralization of 80% of the originally present carboxyl groups was reached, and was cooled with stirring to 100° C. Then 700 parts (1000 g of solution) of Macrynal® SM 516170% BAC (hydroxyl-containing acrylic resin, 70% strength solution in n-butyl acetate; component A1) were stirred in and the mixture was emulsified after homogenization in water.

| Resin parameters: | Mass fraction of solids: | 44.2% by mass |
|---|---|---|
| | Acid no.: | 40 mg/g |
| | Hydroxyl no.: | 112 mg/g |
| | pH. | 8.5 |

EXAMPLE 2

A mixture of 150 parts of B2–3 (300 g of solution) with 350 parts of B1–2 (538.5 g of solution) in a suitable reactor was concentrated by distillation to a mass fraction of solids of 87%. It was then held at 115° C. until the reaction product in a mixing ratio of 3 g of resin to 7 g of water was homogeneously emulsifiable in accordance with the above-mentioned specification. The resultant emulsifier resin B (acid no.=70 mg/g, hydroxyl no.=85 mg/g) was admixed with N,N-dimethyl ethanolamine until a degree of neutralization of 100% of the originally present carboxyl groups was reached, and was homogenized and cooled with stirring to 100° C. Then 500 parts (667 g of solution) of Synthacryl® SC 370/75 SNA (hydroxy-functional acrylic resin; 75% strength solution in a mixture of alkylated aromatic hydrocarbons; component A2) were stirred in and the mixture was emulsified after homogenization in water.

| Resin parameters: | Mass fraction of solids: | 45.2% |
|---|---|---|
| | Acid no.: | 40 mg/g |
| | Hydroxyl no.: | 103 mg/g |
| | pH: | 8.8 |

The Priority Document, Austrian Patent Application A-429/98 filed Mar. 11, 1998 is incorporated herein by reference in its entirety, including the title, abstract, specification and claims.

As used herein, terms such as "a", "an" "the" and the like can denote the singular or plural of the object that follows.

Additional advantages, features and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

We claim:

1. A low-solvent aqueous binder comprising:
   a water-insoluble synthetic resin component A; and
   an emulsifier resin B in a mass ratio of A to B of from 70:30 to 30:70, wherein the emulsifier resin B is a reaction product of a water-insoluble synthetic resin B1 comprising hydroxyl groups as functional groups, a synthetic resin B2 comprising carboxyl groups as functional groups, and a neutralizing agent for the carboxyl groups of B, and wherein the amount of the neutralizing agent is such that said neutralizing agent is able to neutralize from 5 to 200% of the carboxyl groups of B.

2. A low-solvent aqueous binder as claimed in claim 1, wherein the synthetic resin B2 is homogeneously emulsifiable in water following at least partial neutralization.

3. A low-solvent aqueous binder as claimed in claim 1, wherein the emulsifier resin B has an acid number of from 25 to 100 mg/g.

4. A low-solvent aqueous binder as claimed in claim 1, wherein the synthetic resin component A is selected from the group consisting of polyacrylates, polyesters, alkyd resins, epoxy resins, melamine resins and polyurethane resins.

5. A low-solvent aqueous binder as claimed in claim 1, wherein the mass fraction of the hydroxyl-containing syn-

TABLE 2

(Figures are based on the mass fraction of solids of the component concerned). The procedure followed was similar to that of Examples 1 and 2.

| Example | 1 | 2 | 3 | 4 | 5 | 6 |
|---|---|---|---|---|---|---|
| Mass of carboxyl-containing component B2 in g | 120 B2-4 | 150 B2-3 | 175 B2-2 | 120 B2-1 | 100 B2-4 | 180 B2-2 |
| Mass of hydroxyl-containing component B1 in g | 180 B1-1 | 350 B1-2 | 325 B1-3 | 180 B1-4 | 300 B1-4 | 420 B1-3 |
| Solids content before reaction in % by mass | 91 | 87 | 95 | 90 | 89 | 90 |
| Reaction temperature in ° C. | 105 | 115 | 135 | 115 | 105 | 115 |
| Acid no. of the emulsifier resin B in mg/g | 124 | 70 | 57 | 41 | 78 | 49 |
| Hydroxyl no. of the emulsifier resin B in mg/g | 26 | 85 | 108 | 141 | 176 | 117 |
| Degree of neutralization in % of the acid groups originally present in B | 80 DMEA[2] | 100 DMEA[2] | 110 AMP[7] | 120 TEA[8] | 90 DMEA[2] | 100 AMP[7] |
| Component A | resin 1[3] | resin 2[4] | resin 3[5] | resin 4[6] | resin 2[4] | resin 3[5] |
| Mass of component A in g | 700 | 500 | 500 | 300 | 600 | 400 |
| Mass fraction of solids of the resin mixture[1] in % | 44.2 | 45.2 | 42.8 | 43.0 | 42.6 | 44.2 |
| Acid number of the resin mixture in mg/g | 40 | 40 | 32 | 32 | 37 | 33 |
| Hydroxyl number of the resin mixture in mg/g | 112 | 103 | 127 | 159 | 142 | 130 |
| pH value | 8.5 | 8.8 | 8.8 | 8.7 | 8.5 | 8.7 |

[1] Solids content after concentration
[2] N,N-Dimethyl ethanolamine
[3] Macrynal ® SM 516/70 BAC from Vianova Resins GmbH (hydroxyl-containing polyacrylate)
[4] Synthacryl ® SC 370/75 SNA from Vianova Resins GmbH (hydroxyl-containing polyacrylate)
[5] Macrynal ® VSM 2800/70 BAC from Vianova Resins GmbH (hydroxyl-containing polyacrylate)
[6] Macrynal ® VSM 1565/70 BAC from Vianova Resins GmbH (hydroxyl-containing polyacrylate)
[7] Aminoethyl propanediol
[8] Triethylamine thetic resin B1 is from 85 to 55% of the sum of the masses of the resins B1 and B2 and the mass fraction of the carboxyl-containing synthetic resin B2 is from 15 to 45%, the sum of the mass fractions adding to 100%.

6. A low-solvent aqueous binder as claimed in claim 1, wherein the hydroxyl number of component B1 is from 40 to 250 mg/g.

7. A low-solvent aqueous binder as claimed in claim 1, wherein the acid number of component B2 is from 40 to 350 mg/g.

8. A low-solvent aqueous binder as claimed in claim 1, wherein a polyacrylate resin is employed as said synthetic resin A.

9. A process for preparing a low-solvent aqueous binder comprising:

mixing a water-insoluble synthetic resin component B1 comprising hydroxyl functional groups and a synthetic resin B2 comprising carboxyl functional groups in bulk or dissolved in an organic solvent to form a mixture, removing the solvent by applying substmospheric pressure and heating until the content of the mixture is at least 85% by mass, maintaining the mixture at a temperature from 90° to 150° C. until the reaction product of said mixture is homogeneously emulsifiable in a mass ratio of 3 parts of resin to 7 parts of water, neutralizing the reaction product by adding a neutralizing agent in an amount sufficient to neutralize from 5 to 200% of carboxyl groups that have remained following the reaction, adding a water-insoluble synthetic resin A in a mass ratio of A to B of from 70:30 to 30:70, and emulsifying the mixture in water.

10. A coating composition comprising a low-solvent aqueous binder as claimed in claim 1.

11. A one component coating composition comprising a low-solvent aqueous binder as claimed in claim 1.

12. A two component coating composition comprising a low-solvent aqueous binder as claimed in claim 1.

13. An adhesive comprising a low-solvent aqueous binder as claimed in claim 1.

14. A sizing agent comprising a low-solvent aqueous binder as claimed in claim 1.

* * * * *